Figure 1:
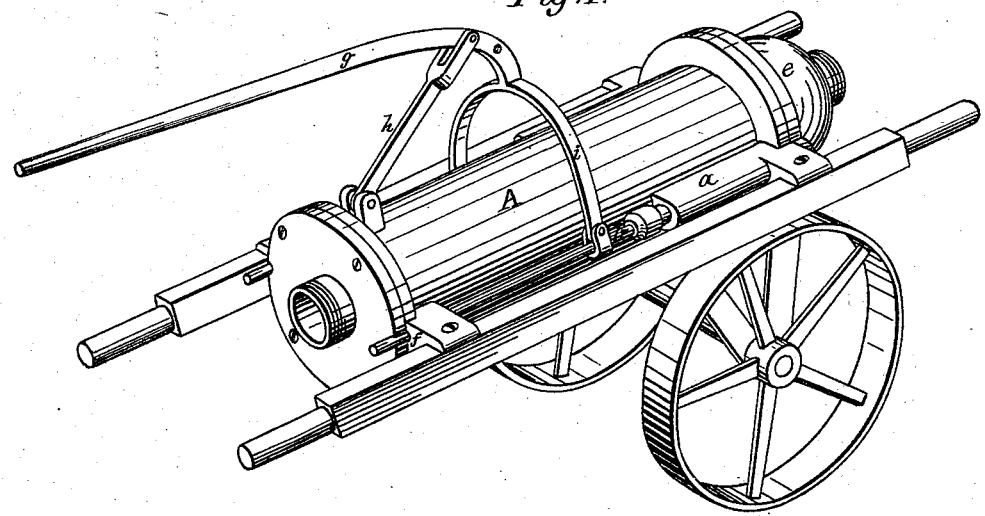

2 Sheets--Sheet 1.

W. PAINTER & L. R. KEIZER.
Pumps for Emptying Cess-Pools, &c.

No. 155,670. Patented Oct. 6, 1874.

Witnesses.
P. F. Larner
A. B. Cauldwell

Inventors:
William Painter
Lewis R. Keizer
By Wm. C. Mm
Attorney

2 Sheets--Sheet 2.

W. PAINTER & L. R. KEIZER.
Pumps for Emptying Cess-Pools, &c.

No.155,670. Patented Oct. 6, 1874.

Witnesses
P. F. Larner
A. B. Cauldwell

Inventor:
William Painter,
Lewis R. Keizer,
By Mule Mox
Attorney

UNITED STATES PATENT OFFICE.

WILLIAM PAINTER AND LEWIS R. KEIZER, OF BALTIMORE, MARYLAND.

IMPROVEMENT IN PUMPS FOR EMPTYING CESS-POOLS, &c.

Specification forming part of Letters Patent No. 155,670, dated October 6, 1874; application filed September 19, 1874.

*To all whom it may concern:*

Be it known that we, WILLIAM PAINTER and LEWIS R. KEIZER, both of the city and county of Baltimore, in the State of Maryland, have invented certain new and useful Improvements in Pumps.

The several objects sought and practically attained by our herein-described improvements are—

First, a wholly unobstructed central passage from one end of the pump to the other, whereby such more or less solid matter as is liable to be found in privy-vaults, cess-pools, &c., may be readily passed through the pump without liability of becoming clogged or engaging with the piston-operating devices. This we accomplish by providing the barrel of the pump with induction and eduction apertures at opposite ends of the barrel, preferably as nearly as possible in line with each other, and with the axial line of said barrel, and in the combination therewith of a valve-piston operated by a rod, or by rods, which are attached to the piston adjacent to its periphery, and occupy positions either outside of or closely adjacent to the interior walls of the pump-barrel. In order to locate the piston-rods wholly outside of the water-way, we have devised certain novel piston-rod chambers, located at one side of the barrel, but communicating with its interior.

Secondly, the ready passage in a direct line of more or less solid and viscous matter through the pump and its valves; and this we accomplish by the combination, with a barrel, which receives at one end and discharges at the other without material deviation from a straight line, a check-valve and a piston-valve, which have seats in a plane practically parallel with the axial line of the pump-barrel.

Thirdly, compactness in structure; and this we accomplish by a novel combination of the cylinder provided with the piston-rod chambers, and piston-rods turned to the rear and connected with a pump-brake.

Fourthly, a pump so mounted that it will be constantly charged, will retain its offensive contents without liability of discharging thereof while being removed from place to place, and coupled or uncoupled from conducting-hose, and will admit of the ready and easy passage of semi-solid matter through it. These points we secure by mounting the pump on an inclined portable platform; and we do hereby declare that the following specification, taken in connection with the drawings furnished, and forming a part thereof, is a clear and accurate description of our invention, and of a pump embodying the several features enumerated.

Figure 2:
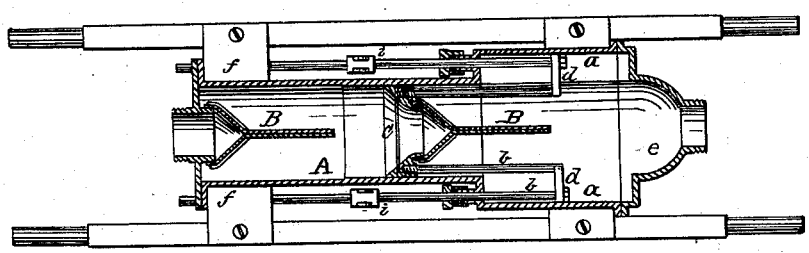
Figure 3:
Figure 4:
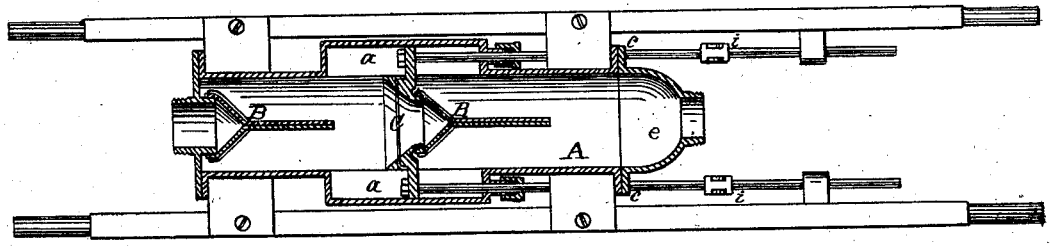
Figure 5:
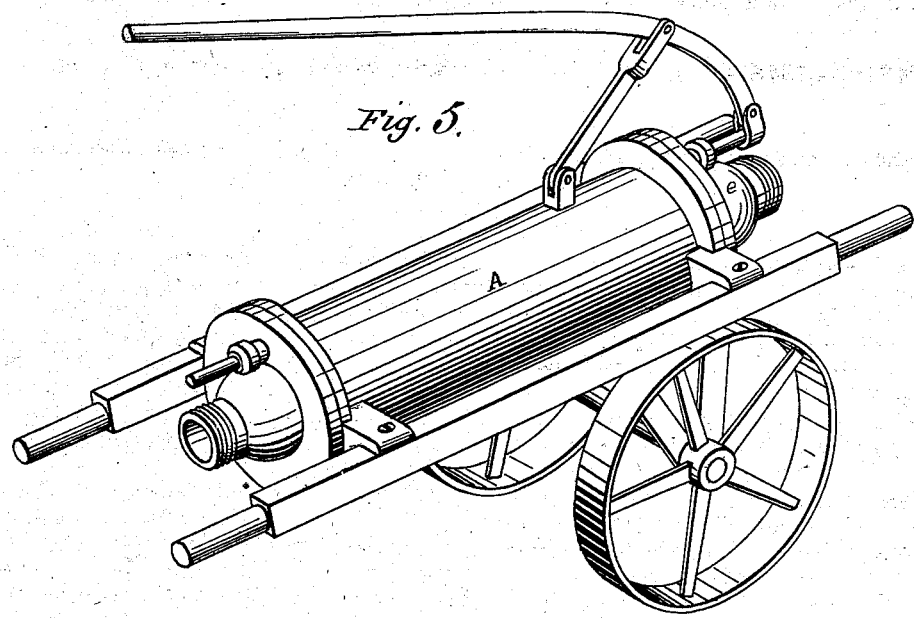
Figure 6:
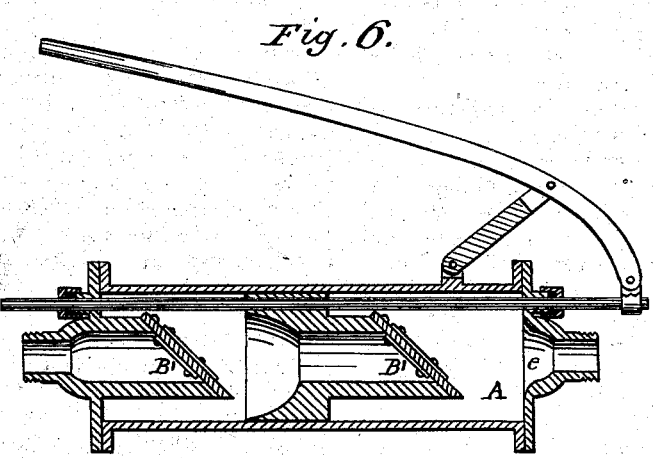

Referring to the drawings, of which two sheets are furnished, Figure 1 represents, in perspective, one of our pumps. Fig. 2 represents the same in section. Fig. 3 represents the piston detached from the cylinder. Figs. 4, 5, and 6 represent modifications of our pump.

A denotes the pump-cylinder. From the peculiar nature of the matter found in cess-pools, privy-vaults, &c., it is essential in transferring it to a tank, for instance, that it be moved in practically direct lines. Sharp turns in the pump, or in the conducting or transferring apparatus, tending to abrupt changes of direction in the passage of the matter, inevitably result in clogging, for the reason that sticks, stones, rags, old clothing, and straw are always in greater or lesser quantities deposited in receptacles of the character referred to. Therefore, our pump cylinder is provided with an induction-aperture in one head and an eduction-aperture in the other, the eduction-aperture being virtually in an extension of the barrel, as shown, and each end of the barrel has a threaded neck for coupling with suction and conveying hose. As it is important that there should be an unobstructed passage through the pump, it is essential that the piston-operating rods be so connected to the piston that said rod or rods shall not occupy a central position in the pump barrel or cylinder, as is usual in reciprocating valve-piston pumps. With a centrally-located piston-rod it will be obvious that such matter as rags, straw, &c., would be liable to become wrapped around said rod, and result in such a clogging of the pump as would necessitate a complete separation of the parts composing it. We therefore have devised the novel feature of connecting the piston rod or rods with the valve-piston adjacent to the periphery of the latter, whereby said rods occupy positions more or less closely adjacent to the inside wall of the cylinder, or even outside of said inside wall, as fully illustrated and described herein. For instance, in Figs. 1 and 2 a pump is shown in which the rods are attached to the piston closely adjacent to its periphery at opposite points, admitting of the location of the discharge-aperture at the center of the head of the pump and between the rods.

In Fig. 4 the piston has ears, which, being properly packed, enter certain piston-rod chambers, and to these ears the piston-rods are attached.

In Figs. 5 and 6 but a single rod is employed, occupying a position analogous to either of those in Figs. 1 and 2.

In all of these it will be seen that the water-way is practically unoccupied by the piston-operating mechanism, and in one instance—Fig. 4—they are wholly outside of the cylinder.

It has been demonstrated, however, that good results may be attained, provided the said rods are located and operate in a line sufficiently near the interior wall of the barrel as to leave the main central portion of the latter unobstructed, as shown.

The piston-rod chambers $a$ constitute one of the novel features of our invention in the construction of a pump-cylinder. These chambers are located on opposite sides of the cylinder, as shown, and have a length equal to, or a little greater than, that portion of the main cylinder which is traversed by the piston.

By reason of these piston-rod chambers the rods $b$ for operating the pistons may be directed either to the rear, as shown in Fig. 1, or projected through the flange at $c$ on each side of the head, as shown in Fig. 4. When passed to the rear the piston-rod may be made of two sections, and connected by a rigid yoke, as at $d$, or a simple return-bend may be employed if the rod be in one piece. When passed to the front, as shown in Fig. 4, the piston will be provided with ears, properly packed, which project into the piston-rod chambers, and to these ears the piston-rods are attached.

In both cases it will be seen that the piston-rods are practically removed from the water-way of the pump, and that the matter passing through it on reaching the curved surface of the pump-head $e$ is directed into the conducting-hose coupled thereto.

It will be seen in Fig. 4, when the rods are carried forward through the side flanges, that the rod-guides and a portion of the brake are, necessarily, located mainly in front of the pump, and to that extent they add to the length of the apparatus.

Such a pump will perform as good service as any other; but, in a portable apparatus, which, in practice, is loaded upon, and taken from, a cart or dray from twenty-five to forty times in every twenty-four hours, it is of value that the apparatus be as compact in form as possible. It is also of value that said apparatus should occupy the least possible space upon the dray, in order that a greater number of casks or tanks (when such are employed) may be carried thereon.

To render the apparatus more compact the piston-rods are returned toward the rear, are passed through and fitted to guides in flanges at the rear head of the pump, as at $f$.

The brake $g$, mounted on a swinging fulcrum, $h$, pivoted to the top of the rear end, and connected by a yoke, as at $i$, to both piston-rods, completes the pump.

The piston-rods should in all cases be provided with stuffing-boxes, as shown.

In practice, with all pumps, they must be charged with fluid at commencement of service, and this is particularly essential with pumps employed in this special service. It is, therefore, of value to have the pump so mounted that it may retain a charge in its cylinder while being conveyed from place to place without liability of discharging in transit any considerable portions of its offensive contents. In practice, however, in order to obviate any possibility of such partial discharge, screw-caps are employed for closing each end.

So far as merely retaining a charge is concerned, it is obvious that a vertical pump would accomplish that result; but practice has demonstrated that the solid or semi-solid matter encountered by a pump employed in this service will not readily pass in vertical lines. Therefore, we mount our pump at an incline of, say, twenty-five degrees, which not only enables the pump to retain at all times a proper charge for resuming work, but admits of an easy passage of any and all matter which passes the valves, and at the same time practically obviates the liability of any discharge of its contents while handling or removing it.

When in position, and properly capped, the rear end is raised and the suction-hose coupled thereto. Then the conveying-hose is attached at the opposite end, it having resumed its elevated position.

By this method it will be seen that no objectionable discharge of matter from the pump can possibly occur.

For service in small towns or villages the inclined pump-platform may be mounted on two legs, located at the front end; but for service in cities, where extensive use is demanded, we prefer to mount it at the front end, on wheels of suitable size to effect the proper inclination.

It will be seen that when in the inclined position shown the valves are both properly flooded; also, that by reason of the inclined position the air liable to be contained in the pump prior to and during its use is readily expelled at every forward movement of the piston. So marked is this feature that, although retaining all the while sufficient fluid matter to charge the valves, a few quick strokes of the piston will draft air through the suction-hose with sufficient power to free it from any ordinary semi-solid matter contained therein, after a vault or cess-pool has been emptied. Moreover, one end of the platform resting on the ground, and being lower than the other, the main portion of the weight of the pump is borne by that end, and it is thereby rendered firm in its position while in operation. The degree of inclination may, of course, be somewhat varied, although we find, in practice, that an incline of about twenty-five degrees meets fully the several requirements of the service.

In Figs. 5 and 6 we show a pump of somewhat different construction, but which embodies to a valuable degree several features of our invention. It will be seen that the cylinder is not provided with piston-rod chambers. The valve-piston is, however, connected with the piston-rod, substantially as shown in Fig. 2. Instead of two rods a single one is employed, and that is attached to the valve-piston by passing entirely through it closely adjacent to its periphery, and extends through both heads, obviating the necessity of any exterior guides. It will be obvious, the rod being of proper size, and also properly attached to the valve-piston, that the latter may be evenly and smoothly operated without undue friction. In this case, as in Fig. 2, the piston-rod occupies a position closely adjacent to the inner wall of the barrel, and therefore in no manner obstructs the water-way. From its particular location at the upper side of the barrel, it is especially removed from liability of being clogged by any extraneous matter. Two rods may be employed in like manner instead of one, as it is obvious that to use but one instead of two, as previously shown, involves merely a question of strength, bulk of material, and workmanship in construction, and fitting the piston, the rod, and the stuffing-boxes.

The valves shown in Figs. 2 and 4, at B, constitute no part of our present invention, as they are the subject of Letters Patent granted to W. PAINTER, August 5, 1873, No. 141,587. Nor do the valves shown at B', in Fig. 6, constitute any portion of the invention to be covered by these Letters Patent, as they have been made the subject of a separate application with a view to securing Letters Patent thereon.

Those shown in Figs. 2 and 4 may be briefly described as a double flap-valve, having extensive valve-contact of the flaps. Each flap may be properly described as having a seat against the vertical coincident face of the other, so that when both valves are open there is a free and unobstructed passage directly through the pump.

The valves B' may be described as having seats inclined at an angle of about twenty-two and a half degrees, a line drawn at right angles to the axial line of the barrel of the pump, and as also having flexible flaps longitudinally stiffened, and secured at their bases to the valve-seat.

It will be seen that in opening to their fullest capacity the flaps at their free ends, by moving in the arc of a circle to the extent of but twenty-two and a half degrees, will be parallel with the axial line of the chamber. In both cases the valves are seated in a line practically parallel with the axial line of the pump, and that, therefore, by reason of their flexibility, they can both close upon and surround any extraneous matter temporarily retained thereat, and yet perform good valve-service.

It will be seen, if any ordinary valves be employed which are seated in lines practically at right angles with the axial line of the pump, that any comparatively rigid matter—like a stick, for instance—if caught by the valve in the act of closing, would prevent the valve from being seated sufficiently to prevent a reflux of the matter already passed through it; and it is for this reason that the valves should seat, or be capable of being seated, in lines practically parallel with the axial line of the pump; and although a seat inclined at an angle slightly less than twenty-two and a half degrees, as shown, might be employed with tolerable results, the variation should be in the opposite direction for attaining the greatest utility.

As an instance in illustration, army-blankets have been encountered in privy-vaults and drawn through the suction-hose, and, with such valves as shown herein, may be readily passed through the pump with the usual quantum of fluid, fecal matter, &c. Such a result could not be accomplished with valves which closed on seats practically at right angles to the axis of the pump, for they would be clogged at once, and require a dissection of the pump to effect a clearance, involving not only delay, but all the consequent loss attendant thereon.

To further illustrate, a pump with the valves shown in Figs. 2 and 4 has often on exhibition been made to draw from a tub a large-sized rope forty feet in length, meanwhile pumping water nearly or quite up to its normal capacity. Such matter as will be retained in both valves at the time of closing is often encountered, and therein lies the necessity of their possessing the general characteristics as stated.

For this reason we provide the piston with the funnel-shaped base, heretofore employed in piston-pumps, as shown at C. The inclined annular surface, with its edge, in the downward movement of the piston, clears the interior of the cylinder, and directs the semi-solid charge inward toward the valve-port, through which it is forced by the movement of the piston. The presence and contact of gritty matter also tends to the undue wear of the piston-packing at K; but this is in a measure obviated by the presence of the base C, which serves to protect the packing, and adds largely to the durability thereof.

Having thus described our invention, we claim as new, to be secured to us by these Letters Patent—

1. A pump for discharging the contents of cess-pools, privy-vaults, &c., consisting of the following elements in combination, to wit: A pump-cylinder having open ends constituting the induction and eduction passages; a valve-piston operated by one or more rods located closely adjacent to the interior walls of the cylinder; and valves which seat in lines practically parallel with the axial line of the cylinder, substantially as described.

2. In combination with a pump-barrel, having its discharge-aperture formed by a longitudinal extension of the barrel, of a valve-piston operated by a rod or rods which occupy a position closely adjacent to the interior surface of the barrel, substantially as described, whereby the water-way in the pump, between the valve-piston and the discharge-orifice, is practically unobstructed, as specified.

3. A pump-cylinder, provided with piston-rod chambers located outside of the water-way, and commmunicating therewith, substantially as described.

4. The combination of a pump-cylinder, having piston-rod chambers, with return piston-rods, and a pump-brake, substantially as described.

5. A portable pump mounted upon an inclined platform, substantially as described.

WILLIAM PAINTER.
LEWIS R. KEIZER.

Witnesses:
CHARLES H. BOND,
JOHN C. MURRILL.